United States Patent
White et al.

[11] Patent Number: 6,064,449
[45] Date of Patent: May 16, 2000

[54] AUTOMATIC CHARACTERIZATION OF A TELEVISION SIGNAL

[75] Inventors: Christopher M. White, San Francisco; Steve Waserman, Mountain View; Lawrence A. Kenyon, Sunnyvale, all of Calif.

[73] Assignee: WebTV Networks, Inc., Mountain View, Calif.

[21] Appl. No.: 08/961,711

[22] Filed: Oct. 31, 1997

[51] Int. Cl.[7] .................................................... H04N 5/50
[52] U.S. Cl. .......................... 348/732; 348/558; 348/555; 348/554
[58] Field of Search ............................. 348/552, 10, 731, 348/732, 554, 555, 558

[56] References Cited

U.S. PATENT DOCUMENTS 5,087,977  2/1992  Suizu ...................................... 348/732

FOREIGN PATENT DOCUMENTS

97/12486  4/1997  WIPO .............................. H04N 7/16

OTHER PUBLICATIONS

PC Magazine Trend Online, The Big–Tube PCTV, May 28, 1996.
The Destination Big Screen PC Internet Page, Aug. 21, 1996.

*Primary Examiner*—Andrew I. Faile
*Assistant Examiner*—Sam Huang
*Attorney, Agent, or Firm*—Workman, Nydegger & Seeley

[57] ABSTRACT

A method and apparatus in a client processing system are provided for characterizing an input television signal as broadcast television or cable television and, if the signal is cable television, as IRC cable, HRC cable, or standard cable. The client processing system includes processing circuitry configured to receive hypertext pages from a remote server and to display the hypertext pages on a display device, such as a conventional television set. The client system further includes a television tuner for receiving either cable television or broadcast television signals. When a television signal is initially provided to the client system, the client system executes a routine to automatically characterize the received television signal as broadcast, HRC cable, IRC cable, or standard cable. The characterization is made based upon one or more frequencies at which the incoming television signal is detected.

25 Claims, 4 Drawing Sheets

AUTOMATIC CHARACTERIZATION OF A TELEVISION SIGNAL

FIELD OF THE INVENTION

The present invention pertains to the receiving and processing of television signals. More particularly, the present invention relates to characterization of an input television signal.

BACKGROUND OF THE INVENTION

Television signals are typically transmitted to the viewing public using one of two different mediums, conventional airwaves ("broadcast television") or shielded transmission lines ("cable television"). There are differences in the signals between these two mediums, particularly in terms of the frequencies used. Consequently, modern television sets typically have some means of distinguishing between a cable television signal and a broadcast television signal. This means may take the form of an on-screen menu item or a manual switch operated by the user. It is desirable, however, to eliminate the need for a user to specify the type of signal being provided to a television set. In particular, it is desirable for a television set or other device receiving a television signal to have the ability to automatically identify the received signal as broadcast or cable.

In addition, certain cable television systems shift the frequency of the video and audio carriers from the standard frequencies for some or all television channels. This shifting may be done to reduce interference caused by the mixing of the carriers on the cable system. Two common schemes for shifting the carrier are the Incremental Coherent (related) Carrier (IRC) scheme and the Harmonically Related Carrier (HRC) scheme. Therefore, it is also desirable for a television set or other device receiving a television signal to have the ability to automatically distinguish between IRC, HRC, and standard cable television signals.

SUMMARY OF THE INVENTION

The present invention includes a machine-implemented method of characterizing an input television signal. When a television signal is detected, the type of the signal is automatically identified as a function of a frequency at which the television signal is detected. In specific embodiments of the present invention, the step of identifying the type of the television signal may include distinguishing between a cable television signal and a broadcast television signal, distinguishing between IRC, HRC, and standard cable television signals, or both. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for characterizing an input television signal are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram or other symbolic form in order to facilitate description of the present invention.

In one embodiment, the present invention is included in a processing system known as WebTV. The WebTV system is an inexpensive, user-friendly technology by which a user can access the World Wide Web ("the Web") and other features of the Internet using a conventional television set 3 as an audio-visual output device. Certain functions of the WebTV system may be provided in conjunction with various on-line services using one or more remote, proprietary WebTV servers.

Figure 1:
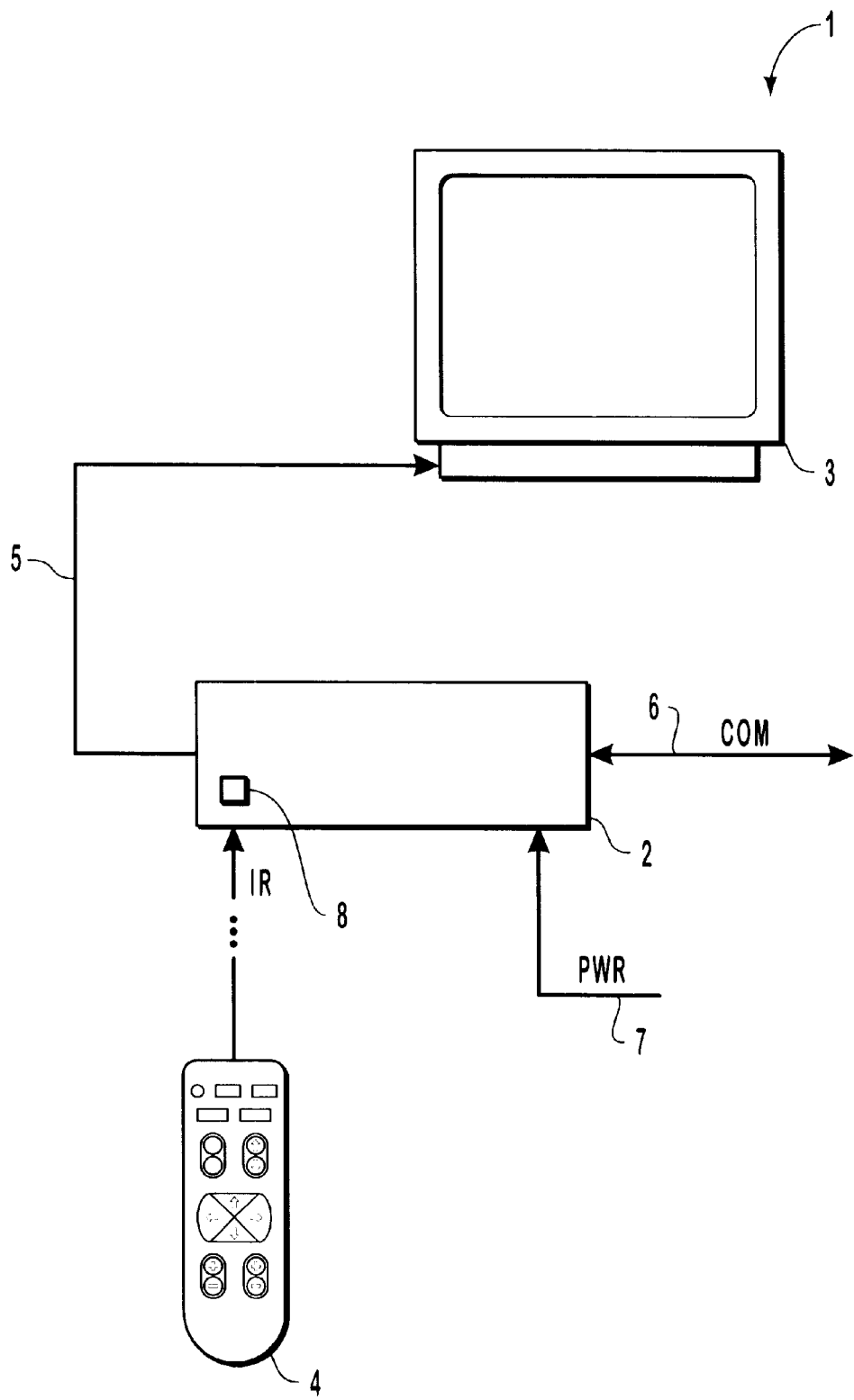
FIG. 1 illustrates a WebTV client system.

The portion of the WebTV system with which the user interacts is referred to as the WebTV "client" system, an embodiment of which is shown in FIG. 1. The WebTV client system 1 includes a "set-top" box 2 (hereinafter the "WebTV box 2" or the "box 2"), the components and functions of which are described further below. To control operation of the system 1, the user enters inputs to the WebTV box 2 using a remote control 4, which sends infrared (IR) signals to an IR sensor 8 on the WebTV box 2. The WebTV box 2 provides an output 5 to the television set 3, which includes audio, video and graphics signals. The WebTV box 2 is also connected to the Internet via a bi-directional data communication line 6. The WebTV box 2 receives AC power via line 7, which originates from a conventional AC wall outlet. In various embodiments, peripheral devices (not shown) may be included in the WebTV client system 1, such as a wireless keyboard, a printer, a mass storage device, etc.

The WebTV box 2 contains Web browser software which, when executed on supporting hardware, enable the client system 1 to receive hypertext pages, such as Web pages, from a remote server, such as a WebTV server or another remote server, and to display the pages on the television set 3. The user can browse through Web pages and otherwise access the Internet by entering inputs from the remote control 4.

Figure 2:
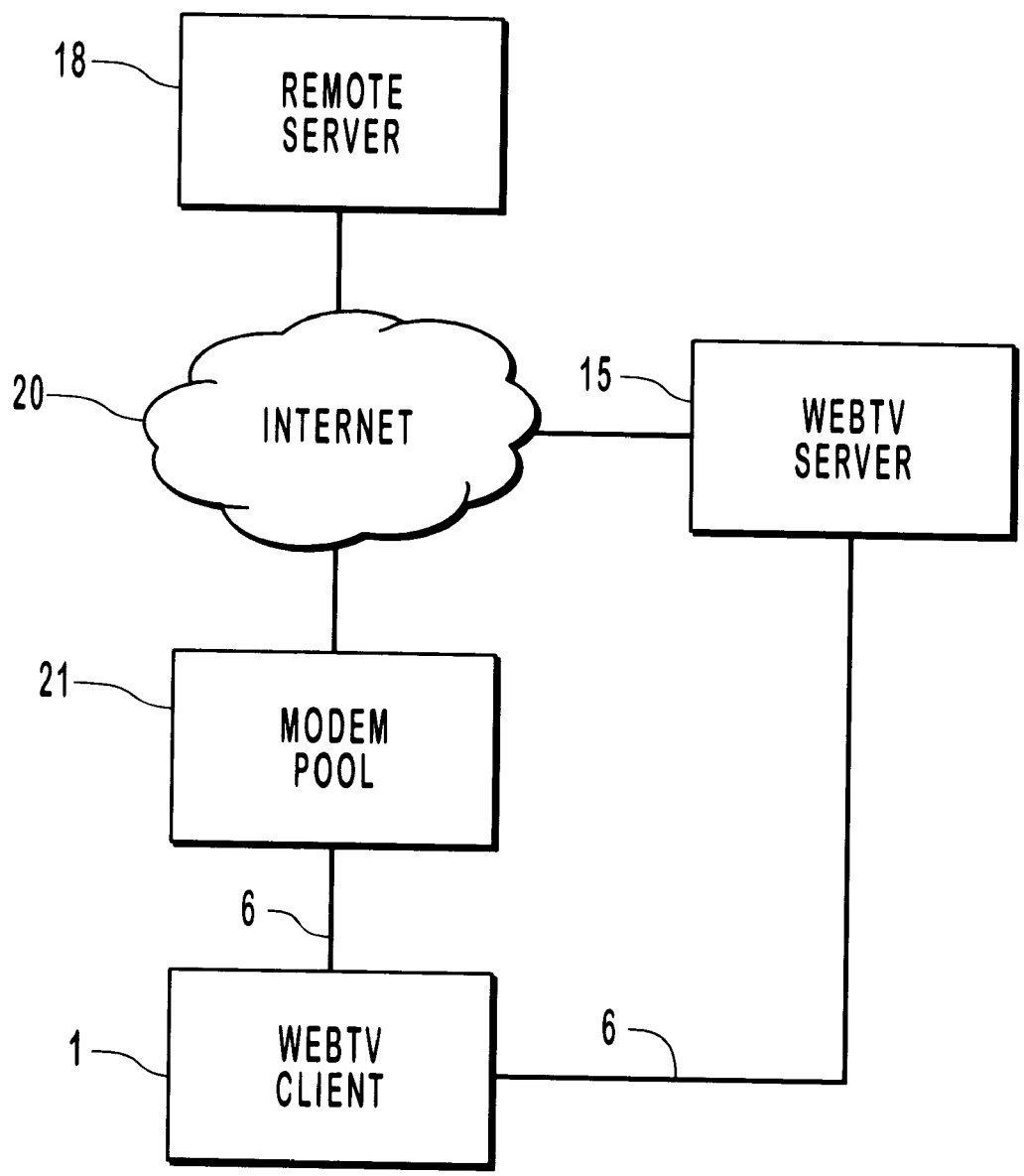
FIG. 2 illustrates a network configuration, including a WebTV client system, a WebTV server system, and a remote server system.

FIG. 2 illustrates a network configuration in which the WebTV client system 1 can communicate with a remote server 18 and a proprietary WebTV server 15. The communication link 6 allows the WebTV client system 1 to access the remote server 18 or the WebTV server 15 through the Internet 20. The WebTV client system 1 may connect to the Internet 20 via a modem pool 21 or via a direct connection to the WebTV server 15. The WebTV server 15 may function as a proxy for the WebTV client system 1 for purposes of accessing the remote server 18. Note that the WebTV server 15 is a processing system which may actually include multiple physical or logical computer systems, and which may be distributed on a network, such as a local area network (LAN) or the Internet 20.

In addition to allowing a user to browse World Wide Web pages, the WebTV client system 1 includes the capability to receive conventional cable or broadcast television signals and to output television images and sound through the television set 3 in a conventional manner. In addition, the box 2 may combine television images and sound with images and sound associated with Web pages or other Internet data and output the combined sound and images via television set 3. For example, the graphics of a Web page may be displayed simultaneously with television video.

Figure 3:
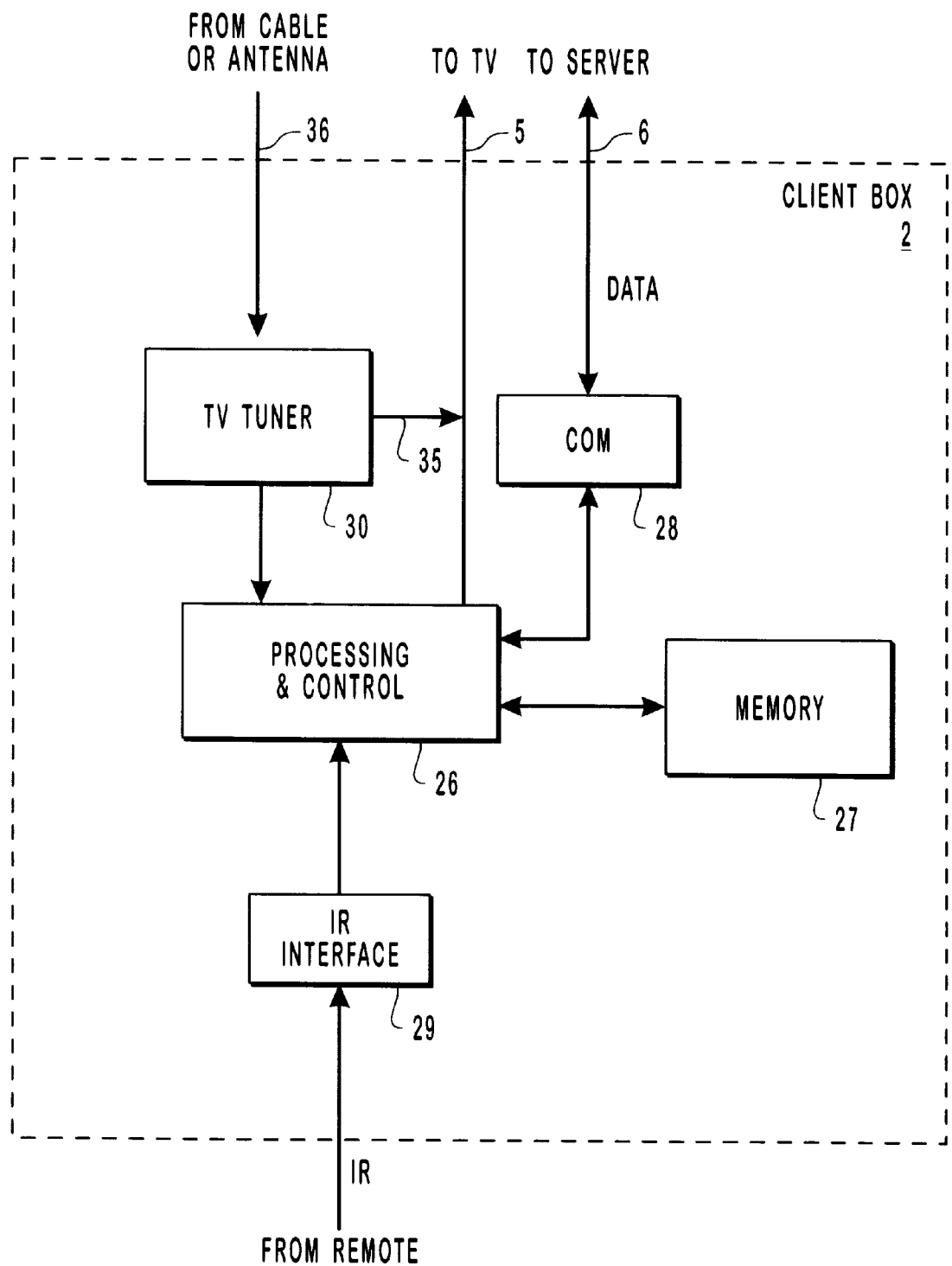
FIG. 3 illustrates a block diagram of the internal components of a WebTV box.

FIG. 3 illustrates the block diagram of the internal components of the WebTV box 2. Note that the diagram of FIG. 3 is intended to be a conceptual diagram and does not necessarily reflect the actual physical construction and interconnections of these components. The details of these components and interconnections are not necessary for acquiring an understanding of the present invention. The overall operation of the WebTV box 2 is controlled by processing and control circuitry 26. Processing and control circuitry 26 may contain one or more general-purpose microprocessors and/or controllers, special-purpose microprocessors and/or controllers, application-specific integrated circuits (ASICs), signal conditioning circuitry, video and/or audio decoder circuitry, analog-to-digital and digital-to-analog converters, buffer circuitry, etc. The processing and control circuitry 26 outputs a signal line 5 to the television set 3. As noted above, this signal line 5 may include data of various modalities, including audio, video and graphics.

A memory 27 is coupled to processing and control circuitry 26, as are a communication device 28, an IR interface device 29, and a television tuner 30. Memory 27 is used to store software instructions to be executed in processing and control circuitry 26, as well as data received via the data communication link 6 (e.g., hypertext pages). Memory 27 may include volatile memory, non-volatile memory, or both. For example, memory 27 may include random access memory (RAM), read-only memory (ROM), flash memory, or a mass storage device (e.g., magnetic disk, magneto-optical disk, CD-ROM, DVD, etc.) or any combination of these devices.

The communication device 28 may be a standard telephone (POTS) modem, an Integrated Services Digital Network (ISDN) adapter, a digital subscriber line (xDSL) adapter, a cable television modem, or any other device suitable for communicating data between the client system 1 and remote processing systems. The IR interface 29 receives and detects IR signals from the remote control device 4 and outputs corresponding signals to the processing and control circuitry 26.

The television tuner 30 receives an input 36 from a standard cable television or antenna connection. Television signals received by the TV tuner 30 are output to the processing and control circuitry 26 to allow various processing to be performed on the television signals. The TV tuner also provides an output 35 coupled to the signal output 5 to the TV, which allows the received television signals to be routed directly to the television 3, if desired, rather than to the processing and control circuitry 26.

The present invention includes a method and apparatus by which the WebTV box 2 automatically characterizes the type (format, scheme, etc.) of the television signal input on line 36 as either cable television or broadcast television signals and, if the input signal is a cable television signal, as IRC, HRC, or standard cable. Various differences exist between broadcast and cable television signals, and between standard cable, IRC, and HRC signals, which can be used to make this characterization. Broadcast television signals use standard Very High Frequency (VHF) and Ultra-High Frequency (UHF) video carrier frequencies. The VHF channel frequencies (channels 2 through 13) are the same as the standard cable channel frequencies. The UHF channel frequencies (channels 14 through 69) have no specific relationship to cable channel frequencies. IRC cable channel frequencies are identical to standard cable channel frequencies, except for channels 5 and 6. IRC and standard cable channel frequencies are 1.25 MHz higher than the HRC frequencies for corresponding channels, except that standard cable frequencies are 0.75 MHz lower than HRC for channels 5 and 6. The present invention, therefore, makes use of these distinctions, by characterizing the input television signal as a function of the frequency at which an input signal is detected.

The box 2 includes an automatic fine tuning (AFT) algorithm, which allows the tuner 30 to automatically "zero in" on a frequency at which a television signal is detected (above some threshold signal level) from a current frequency setting. Algorithms which perform such a function are well-known in the pertinent art. The AFT algorithm may be embodied as instructions stored in memory 27 and executed by processing and control circuitry 26. Thus, when the TV tuner 30 is initially set to a frequency that does not correspond to any TV channel, the AFT will control the TV tuner to find a valid signal at a nearby frequency, if one exists. If the AFT algorithm is executed with the tuner 30 already set to a frequency at which there is a valid signal, the final frequency resulting from execution of the AFT will be the same as the initial frequency.

Figure 4:
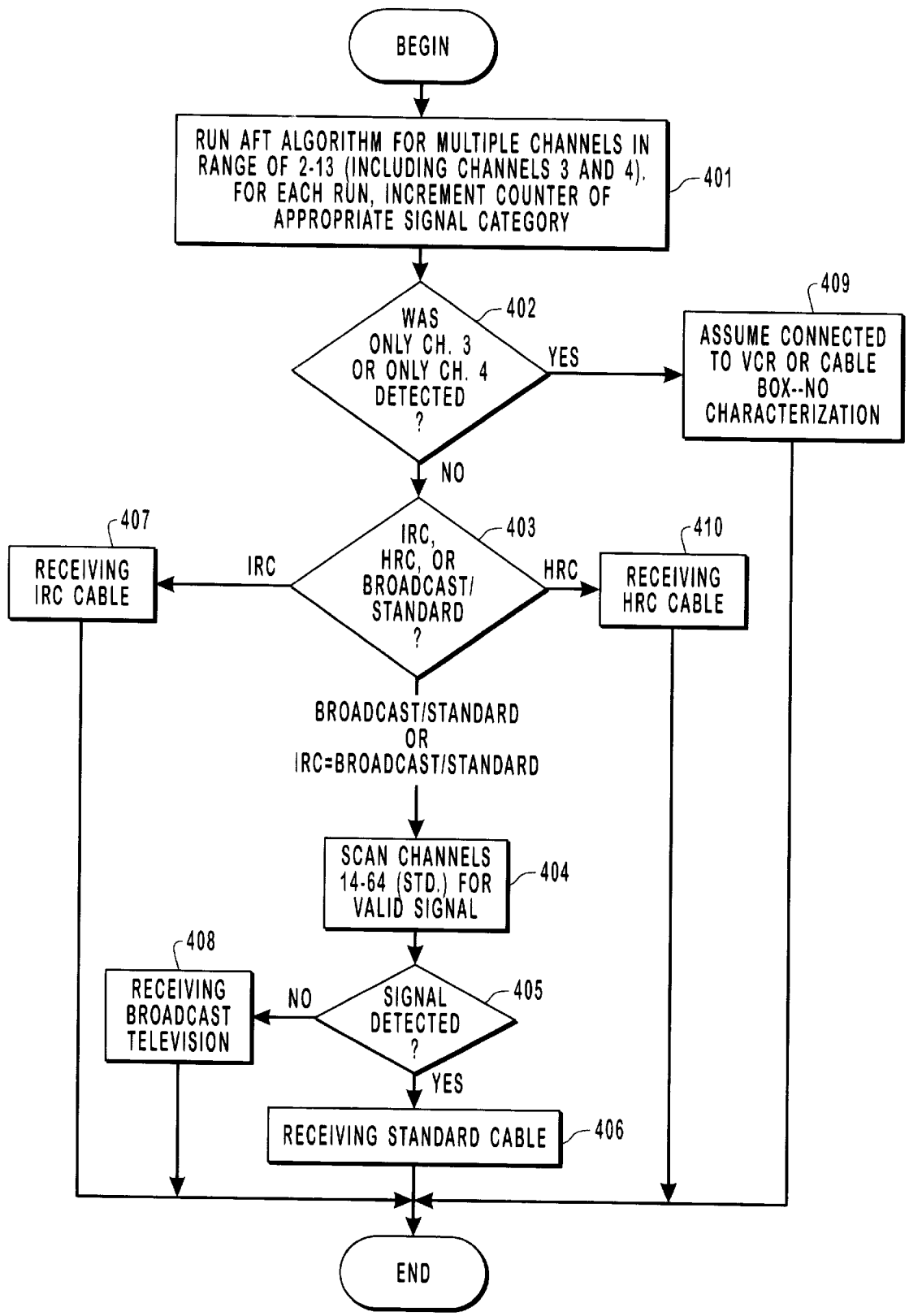
FIG. 4 is a flow diagram illustrating a routine for automatically identifying the format of an input television signal according to a first embodiment.

FIG. 4 illustrates a routine for automatically characterizing an input television signal according to one specific embodiment of the present invention. In step 401, the AFT algorithm is executed to locate a signal for each of several channels in the range of channel 2 through channel 13. In the embodiment of FIG. 4, the AFT is run for channels 3, 4, and at least one other channel, as will be explained in connection with step 402. However, the number of channels used in this step may be varied and may be chosen to achieve a desirable trade-off between speed and accuracy. Each run of the AFT may be initiated with the tuner 30 set at a given one of the IRC frequency, HRC frequency, or broadcast/standard cable frequency for the channel of interest. (Recall that broadcast television and standard cable use identical frequencies for channels 2 through 13.) The runs may be performed sequentially.

Also in step 401, for each run of the AFT, it is determined whether the final frequency resulting from the run of the AFT is closest to the IRC frequency, the HRC frequency, or the broadcast/standard cable frequency of the channel of interest, and a corresponding counter is incremented accordingly. A counter is maintained for each of the three categories, i.e., "IRC", "HRC", and "broadcast or standard cable". Thus, for each run of the AFT, the counter of the category having the frequency (for the channel of interest) which is closest to the final frequency of the AFT is incremented by one (step 401). The count for each category, therefore, may be thought of as a merit value for the corresponding category.

In step 402, it is determined whether only a signal for channel 3 or channel 4 was detected during step 401. Either condition may occur if the box 2 is connected to a video cassette recorder (VCR), a cable television box, or some other device which has its own tuner. Such devices typically provide an output only on channel 3 or channel 4. Hence, if it is determined in step 402 that only channel 3 or only channel 4 was detected, then in step 409 an assumption is made that the box 2 is connected to a video cassette recorder (VCR), cable television box, or some other device with its own tuner, and the routine ends. Note that steps 402 and 409 are optional and may be omitted or modified, of desired.

If additional channels were detected, the routine proceeds to step 403, in which it is determined whether the outcome of step 401 favors characterizing the input signal as "IRC", "HRC", or "broadcast or standard cable". This determination is made on the basis of the merit figures mentioned above. That is, the outcome of step 403 will be the category having the highest count. If the decision of step 403 is "IRC", then it is determined in step 407 that the input television signal is an IRC cable signal, and the routine ends. If, on the other hand, the decision of step 403 is "HRC", then it is determined in step 410 that the input television signal is an HRC cable signal, and the routine ends.

If the decision of step 403 is the "broadcast/standard cable" category or the "IRC" merit value equaled the "broadcast/standard cable" merit value, then in step 404, the standard cable frequencies for the channels in the range of channel 14 through channel 64 are searched for the presence of a signal (e.g., sequentially). The processing and control circuitry includes decoder circuitry which provides an output which is "true" when a signal is detected at a frequency to which the tuner is tuned. If a signal is detected for any channel in this range (step 405), then it is determined in step 406 that the input television signal is a standard cable television signal, and the routine ends. If no valid signal is detected in this range, then it is determined in step 408 that the input television signal is a broadcast television signal, and the routine ends. Note that steps 404, 405, 406 and 408 are based on the assumption that cable providers generally do not provide channels in the ranges of channels 2 through 13 and 65 through 125 without also providing channels in the range of channels 14 through 64.

It will be recognized that numerous variations on the above-described routines are possible within the scope of the present invention. For example, the particular channels for which the presence of a signal is detected may be varied, as noted above. Further, additional channel scans may be added to verify a signal characterization and to increase accuracy. As noted above, in certain embodiments it may be desirable to omit or modify steps 402 and 409 of FIG. 4, in which it is assumed that the box 2 is connected to a VCR, cable box, or other device with its own tuner if only channel 3 or only channel 4 was detected. It may also be desirable to provide the user with the ability to manually override an automatic signal characterization made according to the present invention.

Another embodiment of the present invention makes use of television channel information stored in the WebTV server system 15 to facilitate the automatic characterization of the input television signal. For example, the server 15 may store a database of information on which television channels are used in different geographic areas, which may include the cable channels that are available in different geographic areas (if any) and/or whether cable channels are standard, IRC, or HRC signals. Thus, in response to being supplied with a television signal, the client system 1 provides certain information to the server 15, which the server 15 can use to access the database. The information provided by the client 1 may be, for example, the zip code in which the client 1 is located or Automatic Number Identification (ANI) information, also known as Caller ID. In particular, the server 15 can use this information to look up which cable and/or broadcast channels are available in the client's geographic area and to provide this information to the client 1.

As mentioned above, the server 15 may actually include multiple physical and/or logical computer systems, such that the response provided by the server 15 may actually originate from a different device from the device which stores the database and/or the device which receives the information from the client 1.

The client 1 can then use the information provided by the server 15 to automatically identify the type of the input television signal. For example, the received information might be used to supplement or refine the routine of FIG. 4 to increase its accuracy or to reduce the overall time required to determine the signal type. More specifically, the information can be used to limit the number of channels that are tested in step 401 or step 405 to those channels that are most likely to be used in the client's geographic area.

Alternatively, the server 15 can automatically identify the type of the television signal received by the client 1, based on the database information in conjunction with information provided by the client 1. This identification can then be communicated by the server 15 back to the client 1. Or, if the database information includes specific information on use of standard, IRC, or HRC signals in the area of the client 1, then that information can simply be provided to the client. Alternatively, certain portions of the characterization routine might be performed on the client 1 with other steps performed on the server 15, such that the results of particular steps are communicated between the client 1 and the server 15.

The present invention may be embodied in hardware, software, or a combination of hardware and software. For example, the invention may be embodied as circuitry within the processing and control circuitry 26 (i.e., a microprocessor) carrying out software instructions to perform steps according to the present invention. Such software instructions may be stored in memory 27. In addition, such software instructions may be downloaded to the WebTV box 2 from a remote processing system, such as a WebTV server, and stored for later execution, immediately executed, or interpreted by an interpreter. Thus, the present invention is not limited to any particular combination of hardware and/or software. It will be appreciated that numerous variations on the above-described routines are possible within the scope of the present invention.

Thus, a method and apparatus for characterizing an input television signal have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a processing system that is configured to receive a plurality of television signal types including standard cable (STD), incremental coherent carrier (IRC) and harmonically related carrier (HRC), a method of characterizing an input television signal, the method comprising the following:

a step for tuning to a plurality of television channels in the range of from channel 2 to channel 13;

for each of the plurality of the television channels tuned to in the step for tuning, a step for determining which of the plurality of television signal types that the television channel frequency is closest to;

a step for maintaining a counter corresponding to each of the plurality of television signal types;

a step for incrementing a counter corresponding to a television signal type when the step for determining determines that a television channel corresponds to the television signal type; and a step for automatically identifying the input television signal type as that having the highest counter.

2. The method according to claim 1, further comprising a specific act of automatically determining whether the input television signal is a cable television signal or a broadcast television signal.

3. The method according to claim 1, wherein the step for automatically identifying the input television signal type further comprises a specific act of automatically determining whether the input television signal is an IRC cable television signal.

4. The method according to claim 1, wherein the step for automatically identifying the input television signal type further comprises a specific act of automatically determining whether the input television signal is an HRC cable television signal.

5. The method according to claim 1, wherein the step for automatically identifying the input television signal type further comprises a step for automatically determining whether the input television signal is a standard cable television signal.

6. The method according to claim 1, further comprising a step for determining that the input television signal is provided by a device having its own tuner.

7. The method according to claim 6, wherein the step for determining that the input television signal is provided by a device having its own tuner comprises a specific act of determining that a valid signal for a television channel other than channel 3 or 4 was not tuned to in the step for tuning.

8. The method according to claim 7, wherein the step for automatically identifying the input television signal type comprises the following:
   a specific act of identifying the input television signal type as being either a standard cable or broadcast type;
   a specific act of attempting to tune to valid channels other than in the range of from channel 2 to channel 13;
   a specific act of determining that the television signal type of the input television signal is a broadcast if no valid channel are tuned to in the specific act of attempting to tune; and
   a specific act of determining that the television signal type of the input television signal is standard cable if a valid channel is tuned to in the specific act of attempting to tune.

9. The method according to claim 8, wherein the specific act of attempting to tune to valid channels other than in the range of from channel 2 to channel 13 comprises a specific act of attempting to tune to valid channels in the range of from channel 14 through channel 64.

10. The method according to claim 1, further comprising the following:
    a specific act of the processing system receiving information from a server over the Internet regarding what channels are available in the region where the processing system is located,
    wherein the step for tuning to a plurality of television channels in the range of from channel 2 to channel 13 comprises a specific act of abstaining from tuning to channels when the information does not indicate that such channels are available in the region where the processing system is located.

11. In a processing system that is configured to receive a plurality of television signal types including standard cable (STD), incremental coherent carrier (IRC) and harmonically related carrier (HRC), a computer program product for implementing a method of characterizing an input television signal, the computer program product comprising the following:

a computer readable medium having storing thereon computer-executable instructions for performing the following steps;
   a step for tuning to a plurality of television channels in the range of from channel 2 to channel 13;
   for each of the plurality of the television channels tuned to in the step for tuning, a step for determining which of the plurality of television signal types that the television channel frequency is closest to;
   a step for maintaining a counter corresponding to each of the plurality of television signal types;
   a step for incrementing a counter corresponding to a television signal type when the step for determining determines that a television channel corresponds to the television signal type; and
   a step for automatically identifying the input television signal type as that having the highest counter.

12. The computer program product according to claim 11, wherein the computer-readable medium further includes computer-executable instructions for performing a specific act of determining whether is a standard broadcast television signal, an IRC cable television signal, an HRC cable television signal, or a standard cable television signal.

13. The computer program product according to claim 11, wherein the computer-readable medium further includes computer-executable instructions for performing a step for determining that the input television signal is provided by a device having its own tuner.

14. The computer program product according to claim 13, wherein the computer-readable medium further includes computer-executable instructions for performing the step for determining that the input television signal is provided by a device having its own tuner comprises computer-executable instructions for performing a specific act of determining that a valid signal for a television channel other than channel 3 or 4 was not tuned to in the step for tuning.

15. The computer program product according to claim 14, wherein the computer-executable instructions for automatically identifying the input television signal type comprises computer-executable instructions for performing the following:
    a specific act of identifying the input television signal type as being either a standard cable or broadcast type;
    a specific act of attempting to tune to valid channels other than in the range of from channel 2 to channel 13;
    a specific act of determining that the television signal type of the input television signal is a broadcast if no valid channel are tuned to in the specific act of attempting to tune; and
    a specific act of determining that the television signal type of the input television signal is standard cable if a valid channel is tuned to in the specific act of attempting to tune.

16. The computer program product according to claim 15, wherein the computer-executable instructions for performing the specific act of attempting to tune to valid channels other than in the range of from channel 2 to channel 13 comprises computer executable instructions for performing a specific act of attempting to tune to valid channels in the range of from channel 14 through channel 64.

17. The computer program product according to claim 11, wherein the computer-readable medium further comprises computer-executable instructions for performing the following:
    a specific act of the processing system receiving information from a server over the Internet regarding what channels are available in the region where the processing system is located, wherein the computer executable instructions for performing the step for tuning to a plurality of television channels in the range of from channel 2 to channel 13 comprises computer-executable instructions for performing a specific act of abstaining from tuning to channels when the information does not indicate that such channels are available in the region where the processing system is located.

18. In a processing system that is configured to receive a plurality of television signal types including standard cable (STD), incremental coherent carrier (IRC) and harmonically related carrier (HRC), a method of characterizing an input television signal, the method comprising the following:

- a specific act of the processing system tuning to a plurality of television channels in the range of from channel 2 to channel 13;
- for each of the plurality of the television channels tuned to in the step for tuning, a specific act of the processing system determining which of the plurality of television signal types that the television channel frequency is closest to;
- a specific act of the processing system maintaining a counter corresponding to each of the plurality of television signal types;
- a specific act of the processing system incrementing a counter corresponding to a television signal type when the step for determining determines that a television channel corresponds to the television signal type; and
- a specific act of the processing system automatically identifying the input television signal type as that having the highest counter.

19. The method according to claim 18, further comprising a specific act of the processing system automatically determining whether the television signal is a cable television signal or a broadcast television signal.

20. The method according to claim 18, further comprising a specific act of the processing system determining that the input television signal is provided by a device having its own tuner.

21. The method according to claim 20, wherein the specific act of the processing system determining that the input television signal is provided by a device having its own tuner comprises a specific act of the processing system determining that a valid signal for a television channel other than channel 3 or 4 was not tuned to in the specific act of the processing system tuning.

22. In a processing system that is configured to receive a plurality of television signal types including standard cable (STD), incremental coherent carrier (IRC) and harmonically related carrier (HRC), a computer program product for implementing a method of characterizing an input television signal, the computer program product comprising the following:

a computer readable medium having storing thereon computer-executable instructions for performing the following:

- a specific act of the processing system tuning to a plurality of television channels in the range of from channel 2 to channel 13;
- for each of the plurality of the television channels tuned to in the specific act of the processing system tuning, a specific act of determining which of the plurality of television signal types that the television channel frequency is closest to;
- a specific act of maintaining a counter corresponding to each of the plurality of television signal types;
- a specific act of incrementing a counter corresponding to a television signal type when the step for determining determines that a television channel corresponds to the television signal type; and
- a specific act of automatically identifying the input television signal type as that having the highest counter.

23. The computer program product according to claim 22, wherein the computer-readable medium further includes computer-executable instructions for performing a specific act of determining whether is a standard broadcast television signal, an IRC cable television signal, an HRC cable television signal, or a standard cable television signal.

24. The computer program product according to claim 22, wherein the computer-readable medium further includes computer-executable instructions for performing a specific act of the processing system determining that the input television signal is provided by a device having its own tuner.

25. The computer program product according to claim 24, wherein the computer-executable instructions for automatically identifying the input television signal type comprises computer-executable instructions for performing the following:

- a specific act of identifying the input television signal type as being either a standard cable or broadcast type;
- a specific act of attempting to tune to valid channels other than in the range of from channel 2 to channel 13;
- a specific act of determining that the television signal type of the input television signal is a broadcast if no valid channel are tuned to in the specific act of attempting to tune; and
- a specific act of determining that the television signal type of the input television signal is standard cable if a valid channel is tuned to in the specific act of attempting to tune.

* * * * *

UNITED STATES PATENT AND TRADEMARK OFFICE
CERTIFICATE OF CORRECTION

PATENT NO.    : 6,064,449
DATED         : May 16, 2000
INVENTOR(S)   : Christopher M. White, Steve Wasserman and Lawrence A. Kenyon It is certified that error appears in the above-identified patent and that said Letters Patent is hereby corrected as shown below:

<u>Title page,</u>
Item [75], after "Steve" please change "Waserman" to -- Wasserman --

Signed and Sealed this

Eighth Day of April, 2003

JAMES E. ROGAN
*Director of the United States Patent and Trademark Office*